United States Patent [19]
McDonald

[11] 3,823,632
[45] July 16, 1974

[54] APPARATUS FOR CUTTING AND LOCATING FLEXIBLE BED LATHS IN A WOOD BUNDLE

[75] Inventor: Edwin Robert McDonald, Lions Bay, British Columbia, Canada

[73] Assignee: AB Hammars Mekaniska Verkstad, Nyland, Sweden

[22] Filed: Feb. 15, 1973

[21] Appl. No.: 332,688

[30] Foreign Application Priority Data
  Feb. 22, 1972  Switzerland.......................... 2150/72

[52] U.S. Cl....................... 83/150, 83/649, 83/607, 83/157, 83/159
[51] Int. Cl............................................. B26d 7/06
[58] Field of Search ............ 83/157, 150, 151, 442, 83/607, 608, 609, 601, 649

[56] References Cited
UNITED STATES PATENTS
| | | | |
|---|---|---|---|
| 1,497,676 | 6/1924 | Fink | 83/607 |
| 2,032,098 | 2/1936 | Roberts | 83/157 |
| 3,457,817 | 7/1969 | Turnbull et al. | 83/649 |

*Primary Examiner*—Donald R. Schran
*Attorney, Agent, or Firm*—Silverman & Cass

[57] ABSTRACT

A method and apparatus for cutting and locating flexible bed laths for bundling layers of wood. Flexible lath is fed from a roll through a groove along a guiding arm and cut into a desired length by turning of the arm. Turning of the arm is continued so that the groove opens downwardly such that the lath drops down onto the wood to be bundled. The arm is then turned back to the initial position for receiving the next length of lath.

5 Claims, 5 Drawing Figures

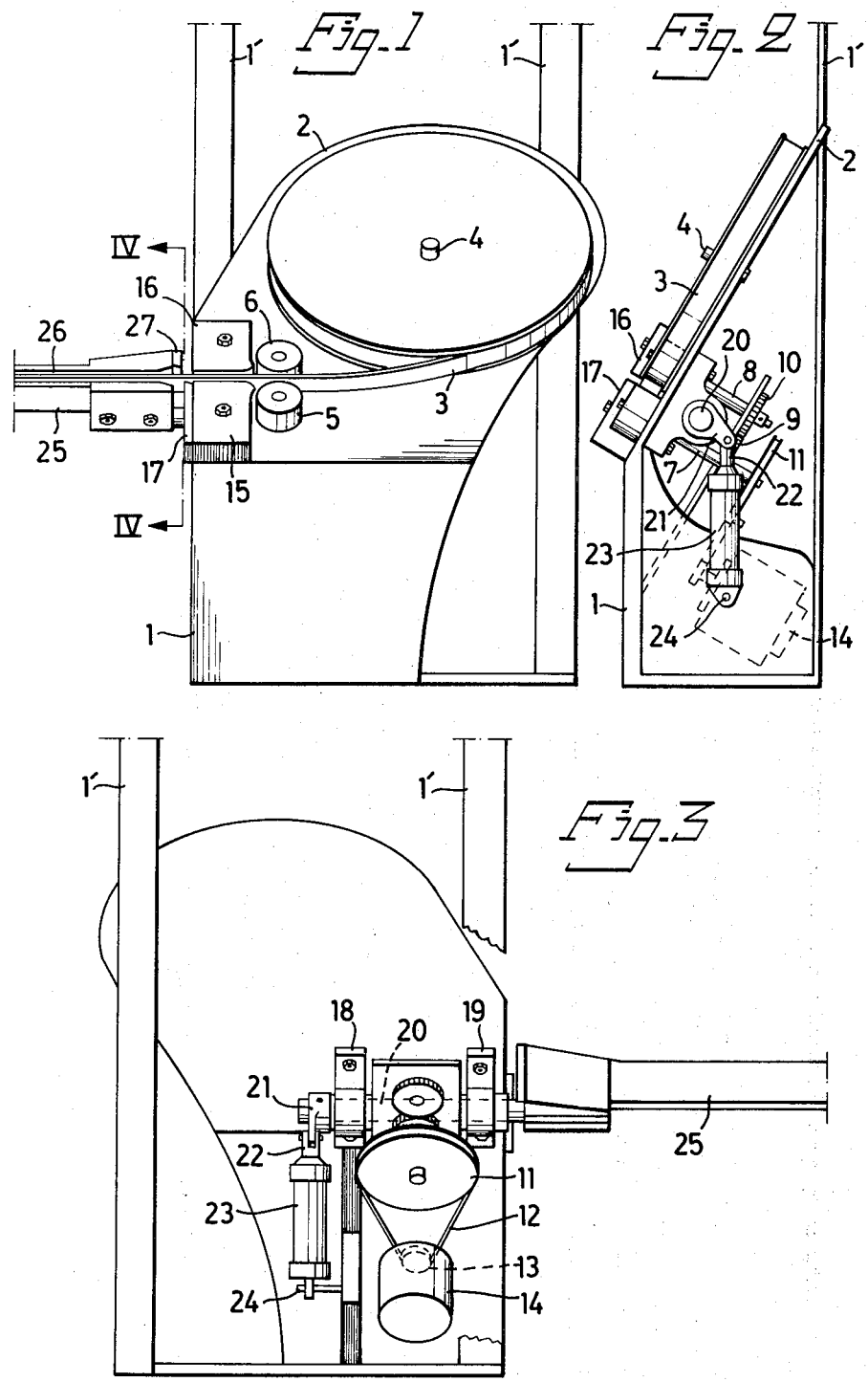

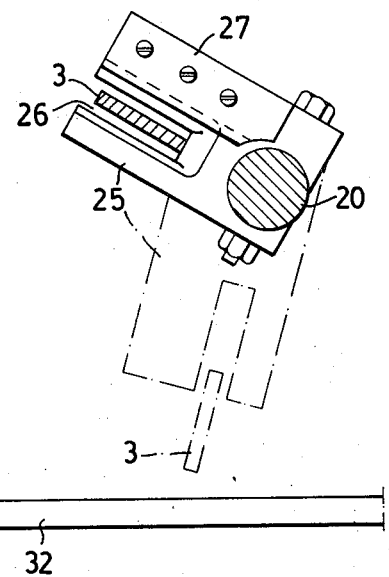
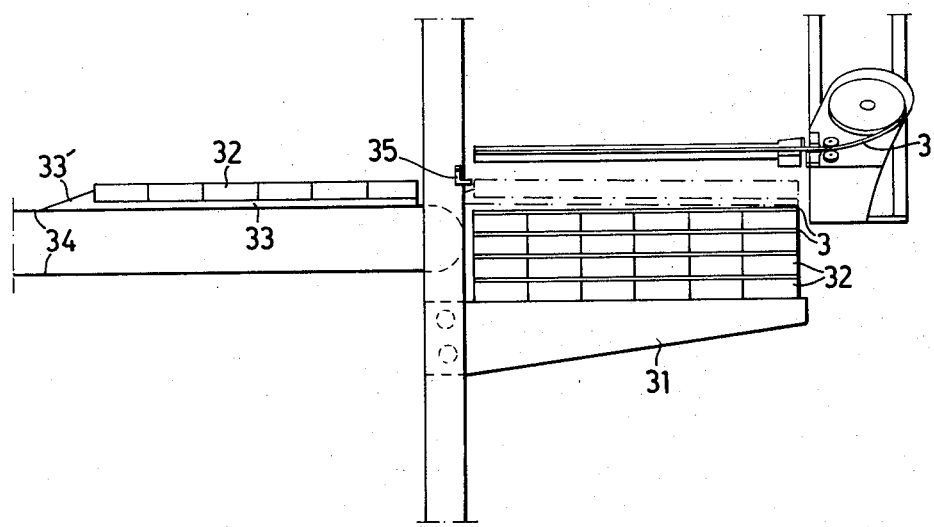

3,823,632

APPARATUS FOR CUTTING AND LOCATING FLEXIBLE BED LATHS IN A WOOD BUNDLE

The present invention relates to a method for cutting and locating flexible bed laths on layers of wood as said layers are built up to form a bundle of wood, which bundle thereafter usually is tied up with ties to form a package of wood. The invention also relates to an apparatus for the performance of said method.

For placing measured rigid laths it is known to arrange the laths in a storage above and across the layer of wood, which is to be part of a bundle of wood, each end of said rigid laths resting in a storage box with a bottom opening, out of which the laths are fed, so that they will fall down on the layer of wood. Consequently the method and the apparatus for performing said method can only be used for rigid laths.

The present invention relates to a way of solving the problem of using flexible laths as crossribs, which can be fed from a lath roll and cut in suitable lengths and mechanically fast and conveniently placed on the desired locations on the layer of wood.

The way of solving this problem is characterized by the fact, that from a supply roll, being formed by a flexible lath, which lath is made of preferably paper with reinforcing fabric or plastics or of some other suitable material, the lath is fed in a groove or guide along a guiding arm, and cut into a determined length by turning of the guiding arm, and during a continued turning of the arm, so that the groove or guide will be open downwards, the lath is let drop down onto the determined location on the layer of wood, and that thereafter the guiding arm will be turned back to a position for receiving the next piece of lath.

An apparatus according to the invention for performing this method is characterized by the fact, that it is provided with a frame with a plane supporting member, the upwards turned upper surface of which forms an angle of preferably 30° relative the vertical plane or is substantially horisontal, said member supporting a supply roll, which is formed by a wound flexible lath. It is further characterized by the fact, that mechanically driven feeding rolls are located on the supporting member to feed the lath between them, and that guiding blocks for the lath are arranged on the supporting member after the feeding rolls in the feeding direction, and that in the longitudinal direction of the lath, which direction is determined by the guiding blocks, a guiding arm being provided with an open longitudinal groove for the lath is fastened on a shaft in the longitudinal direction of the shaft, said shaft and the guiding arm being mechanically rotatable within certain limits and at least 90° in both directions, and that the side edge of the supporting member or one of the guiding blocks supports a fixed cutting plate for cooperation with a cutting plate, which is arranged on the nearest end of the guiding arm, for cutting off the lath, which is fed between the edges of the cutting plates, by turning of the guiding arm around its turning axis in the longitudinal direction of said arm.

The method according to the invention will now be closer described in connection with the description of an embodiment of the apparatus according to the invention, which embodiment is shown on the enclosed drawings as an example.

FIGS. 1–3 show different side views of an apparatus according to the invention.

FIG. 4 shows on a larger scale a cross section at the line IV—IV in FIG. 1.

FIG. 5 shows schematically as an example a plant for bundling wood, said plant being equipped with the apparatus according to the foregoing figures.

According to FIGS. 1–3 the apparatus has a frame 1, which is suspended from shackles 1', said frame supporting a plane supporting member 2 which forms an angle of 30° relative the vertical plane, for a roll being formed by a wound lath 3, on a pivot 4 on the front side of the supporting member. On the same side two feeding rolls 5 and 6 are arranged, being provided with a suitably elastical friction coating, the shafts 7 and 8 of said rolls, FIG. 2, extending through the supporting member and behind it being provided with gears 9 and 10, which engage in each other. The shaft 7 is further provided with a chain wheel 11 which, over a chain 12, is in driving connection with a chain wheel 13 on an electric motor 14, which is fastened on the frame 1. On the front side of the member 2 and adjacent to the feeding rolls 5, 6 a couple of guiding blocks 15 and 16 are located with a space between them, which space is suitable for the lath 3, one of the guiding blocks 15 supporting a cutting plate 17, which extends outside the side edge of the supporting member.

On the back side of the supporting member 2 a couple of bearings 18 and 19 are fastened carrying a shaft 20, which shaft at its one end has an arm 21, by which arm a piston rod 22 engages in a hydraulic cylinder 23, which is journalled on a stud 24 in the frame 1. The arm 21 is swingable by the piston 22 for a temporary rotation of the shaft 20 of about 105° in both directions. The other end of the shaft 20 is extending outside the side edge of the supporting member, and on said shaft end a guiding arm 25 is fixedly but removably arranged, so that it will follow in the rotation of the shaft 20 in both directions.

The guiding arm 25 has a groove 26 along its whole extension, said groove having parallell side walls according to FIG. 4, or the walls may diverge somewhat towards the bottom of the groove. The end of the guiding arm 25, which is fastened at the shaft 20, has on its end surface a cutting plate 27 for cooperation with the before mentioned cutting plate 17. In the initial position the groove 26 of the guiding arm 25 lies straight in front of the space between the blocks 15, 16, so that the middle plane of the groove forms an angle of 30° relative the horisontal plane, the opening of the groove being obliquely directed upwards.

The function of the apparatus is as follows. A roll being formed by a flexible lath of paper or plastics, which preferably is reinforced with fabric, or of some other material, is located on the supporting member 2 and the pivot 4, and the lath is pulled in between the feeding rolls 5, 6 and the guiding blocks 15, 16 to the cutting plate 17. As the motor 14 is started, the feeding rolls 5, 6 feed the lath 3 in the groove 26 of the guiding arm along a determined distance, which as a rule is as long as the length of the arm, whereafter the motor 14 automatically is stopped, and the piston rod 22 in the hydraulic cylinder 23 will swing the arm 21 upwards, so that the shaft 20 will rotate through a corresponding angle in an anti-clockwise direction as shown in FIG. 4. The result of this is that the guiding arm 25 will be turned from its initial position which is shown with solid lines in FIG. 4, to the final position which is shown with dot and dash lines in the same figure. During the rotation of the shaft 20, the cutting plate 27 of the guiding arm 25 will at first move against the cutting plate 17, so that the lath 3 will be cut off. This happens while the groove 26 of the guiding arm is still open upwards, but as the groove will be open more obliquely downwards during the turning of the arm, the cut off piece of lath will slide out of the groove and down onto a layer of wood as will be closer explained below. Thereafter the hydraulic device 22, 23 will be mechanically actuated, so that the arm 21 will be swung downwards and rotate the shaft 20 and therewith the guiding arm 25 to the initial position with the groove 26 straight in front of the lath 3 between the guiding blocks 15, 16, so that a new piece of lath can be fed in the groove 26.

FIG. 5 shows schematically how the apparatus described above preferably is mounted at a bundling station for bundles of wood. On a platform 31 which is vertically movable some layers of wood 32 are placed, said layers being formed by a number of rather long pieces of wood. The platform 31 is adjusted into such a vertical position, that the upper side of its pile of wood is located somewhat lower than a plate or fork 33 with a layer of wood 32, so that the plate 33 with the layer can be fed ahead over the pile of wood on the platform by a conveyor 34. After that and when the plate 33 starts its movement back, a stopper 35 will start to operate, said stopper being schematically shown, and force the layer of wood to remain above the pile of wood until it can fall down thereon. The plate 33 will move under another layer of wood with its barb 33' and fetch said layer, which is to be fed to the pile of wood on the platform 31, said pile now being moved downwards to the right vertical position.

The apparatus according to the invention is suspended by the shackles 1' above and beside of the pile of wood in such a way, that its supporting member forms an angle of 30° relative the horisontal plane and the guiding arm 25 extends across the pile of wood. When the layer of wood 32 has been located in the way described above, the guiding arm 25 is turned and will cut off a length of lath, and during the continued turning of the arm, when the groove 26 will be open downwards, the lath will fall down and lie across the layer of wood, so that the lath will serve as a crossrib. Preferably two or more apparatuses for laths being suspended as described above and with a suitable space between each other can be driven to put down a lath each simultaneously across the layer of wood, whereby the laths provide a small intermediate space in the pile, when the next layer of wood is put down. In this case one apparatus preferably is fixed in position and the other apparatuses have adjustable positions along the pile of wood. The apparatuses may be vertically movable and their guiding arms can permanently extend over the platform and the pile of wood thereon, or the frame of each respective apparatus together with the parts carried thereon may be turnable by a hydraulic device not shown, so that the guiding arm 25 is adjustable across or beside of this in order to allow putting down layers of wood from above and on the platform or layers of wood resting thereon. The apparatus may also be adjustable in the cross direction of the pile of wood. A layer of wood may have a different or varied composition, as for example a layer of rods, which are kept together in a suitable way, etc. Also, if suspended apparatuses are preferable for the provision of free space around the pile of wood, said apparatuses may of course instead be supported by one or more pillars standing on the floor or by thereto fastened beams or brackets.

The invention should not be regarded as limited to the embodiment described above and shown on the drawings, as the embodiment may be varied within the scope of the invention. Especially the frame and the whole driving mechanism for the feeding rolls may be modified and the devices which provide the correct order of the different movements may be modified. The driving mechanism may be adjustable for feeding and cutting different determined lengths of lath. Guiding arms of different lengths and varied guidings of the lath can be used. The plane supporting member 2 may be horisontal, but this implies that the guiding arm must be turned almost 180° for feeding out the cut off lath.

What we claim is:

1. Apparatus for cutting and bundling flexible bed laths comprising, a frame, a planar support member retained on the frame, a supply roll of wound flexible lath supported by the frame, mechanically driven feeding rolls positioned on the support member for feeding the lath therebetween, lath guide blocks positioned on the support member behind the rolls in the longitudinal feeding direction of the lath, a guiding arm mounted on a shaft extending from the frame proximate the blocks, the arm having an open groove extending along the longitudinal dimension thereof for receipt of the lath as it passes through the blocks, the shaft and arm being circumferentially rotatable at least 90° in both directions, a fixed cutting plate on the support member and a second cutting plate on the guiding arm, said cutting plates being cooperative to cut the lath as the guiding arm is turned about its turning axis in the longitudinal direction of the arm.

2. Apparatus as claimed in claim 1 in which the support member is of substantially horizontal disposition.

3. Apparatus as claimed in claim 1 in which the support member is disposed at an angle of 30° with the vertical plane.

4. Apparatus as claimed in claim 1 in which the shaft has a second arm extending generally normal to the longitudinal dimension thereof, a hydraulic device including a cylinder and piston rod positioned between the second arm and the frame, the hydraulic device being operable to swing the second arm and thereby rotate the shaft and guiding arm 105° in both circumferential directions.

5. Apparatus as claimed in claim 1 in which the speed of the feeding rolls is adjustable to feed different lengths of lath between the blocks before cutting by the plates.

* * * * *